US010920103B2

(12) United States Patent
Phelps et al.

(10) Patent No.: US 10,920,103 B2
(45) Date of Patent: Feb. 16, 2021

(54) SILICONE-CONTAINING POLYESTERS, COATING COMPOSITIONS CONTAINING THE SAME, AND COATINGS FORMED THEREFROM

(71) Applicant: PPG Industries Ohio, Inc., Cleveland, OH (US)

(72) Inventors: Alicia Marie Phelps, Allison Park, PA (US); Shawn Allen DeSaw, McMurray, PA (US); Gobinda Saha, Pittsburgh, PA (US); Gereme Thomas Hensel, Pittsburgh, PA (US); Irina G. Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 65 days.

(21) Appl. No.: 16/464,976

(22) PCT Filed: Dec. 4, 2017

(86) PCT No.: PCT/US2017/064478
§ 371 (c)(1),
(2) Date: May 29, 2019

(87) PCT Pub. No.: WO2018/102805
PCT Pub. Date: Jun. 7, 2018

(65) Prior Publication Data
US 2019/0316002 A1 Oct. 17, 2019

Related U.S. Application Data

(60) Provisional application No. 62/429,211, filed on Dec. 2, 2016.

(51) Int. Cl.
*C09D 183/10* (2006.01)
*C09D 7/20* (2018.01)
*C09D 7/42* (2018.01)
*C08G 77/445* (2006.01)

(52) U.S. Cl.
CPC ......... *C09D 183/10* (2013.01); *C08G 77/445* (2013.01); *C09D 7/20* (2018.01); *C09D 7/42* (2018.01)

(58) Field of Classification Search
CPC .......... C09D 183/10; C09D 7/20; C09D 7/42; C08G 77/445; C08G 77/26; C08G 77/28; C08G 77/16; C08G 18/615
See application file for complete search history.

(56) References Cited

U.S. PATENT DOCUMENTS

| | | | |
|---|---|---|---|
| 4,452,962 A | 6/1984 | Ginnings et al. | |
| 4,608,421 A | 8/1986 | Lin | |
| 5,132,392 A | 7/1992 | DeYoung et al. | |
| 5,262,492 A | 11/1993 | Hanada et al. | |
| 5,411,729 A * | 5/1995 | O'Lenick, Jr. ......... | A61K 8/585 424/70.12 |
| 5,508,358 A | 4/1996 | Ono et al. | |
| 5,916,992 A | 6/1999 | Wilt et al. | |
| 8,389,113 B2 | 3/2013 | Ambrose et al. | |
| 8,719,964 B2 | 5/2014 | O'Neill | |
| 2005/0136267 A1 | 6/2005 | Greene et al. | |
| 2010/0196304 A1 | 8/2010 | Lavay et al. | |
| 2012/0156484 A1 | 6/2012 | Vendamme et al. | |
| 2016/0060390 A1 | 3/2016 | Millero, Jr. et al. | |
| 2016/0222169 A1 | 8/2016 | Hinzmann et al. | |
| 2016/0280848 A1 | 9/2016 | Hayes et al. | |
| 2016/0297987 A1 | 10/2016 | Hayes et al. | |

FOREIGN PATENT DOCUMENTS

| | | |
|---|---|---|
| CN | 105722932 A | 6/2016 |
| EP | 2821446 A1 | 1/2015 |
| EP | 2876140 A1 | 5/2015 |
| KR | 20160103000 A | 8/2016 |
| WO | 2015094817 A1 | 6/2015 |
| WO | 2015094979 A1 | 6/2015 |

OTHER PUBLICATIONS

International Search Report of the International Searching Authority for International Application No. PCT/US2017/064478.

* cited by examiner

Primary Examiner — Kuo Liang Peng
(74) Attorney, Agent, or Firm — Michael J. Grese

(57) ABSTRACT

A silicone-containing polyester polyol can include a reaction product prepared from reactants including: a diol; a polyol having at least three hydroxyl groups; a dimer of a fatty acid having two carboxylic acid groups, or an anhydride or ester thereof; and a silicone component having siloxane linkages and at least two reactive functional groups selected from hydroxyl groups, amino groups, thiol groups, carboxylic acid groups, anhydride groups, or combinations thereof. A coating composition for preparing an anti-fingerprinting, soft touch coating can include the silicone-containing polyester polyol and a crosslinker reactive with the silicone-containing polyester polyol.

21 Claims, No Drawings

SILICONE-CONTAINING POLYESTERS, COATING COMPOSITIONS CONTAINING THE SAME, AND COATINGS FORMED THEREFROM

CROSS REFERENCE TO RELATED APPLICATIONS

This application claims the benefit of U.S. Provisional Application No. 62/429,211, filed on Dec. 2, 2016, which is incorporated herein by reference in its entirety.

FIELD OF THE INVENTION

The present invention relates to silicone-containing polyesters, coating compositions containing the same, coatings formed from the coating compositions, and substrates at least partially coated with such coatings.

BACKGROUND OF THE INVENTION

Coatings applied to consumer electronic devices such as cellular phones, portable notebooks, laptops, and the like are often designed to have a soft touch or feel. However, soft touch coatings often exhibit poor anti-fingerprinting properties, especially on dark colored devices. Various attempts have been made to develop coatings that are suitable for consumer electronic devices and which also provide good soft touch properties as well as good anti-fingerprinting properties. However, improvement of anti-fingerprinting properties is often accompanied by a deterioration of the soft touch properties. As such, it is desirable to provide coatings that exhibit a combination of good anti-fingerprinting and soft touch properties.

SUMMARY OF THE INVENTION

The present invention is directed to a silicone-containing polyester polyol comprising a reaction product prepared from reactants comprising: a diol; a polyol comprising at least three hydroxyl groups; a dimer of a fatty acid comprising two carboxylic acid groups, or an anhydride or ester thereof; and a silicone component comprising siloxane linkages and at least two reactive functional groups selected from hydroxyl groups, phenolic groups, amino groups, thiol groups, carboxylic acid groups, anhydride groups, or combinations thereof.

The present invention also includes a coating composition comprising the silicone-containing polyester polyol and a crosslinker reactive with the silicone-containing polyester polyol.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" silicone-containing polyester polyol, "a" coating composition, "a" crosslinker, and the like refer to one or more of any of these items.

As previously described, the present invention is directed to a silicone-containing polyester polyol. A "silicone-containing polyester polyol" refers to a polymer that comprises ester linkages, siloxane linkages, and two or more hydroxyl functional groups. As used herein, the term "polymer" refers to oligomers and homopolymers (e.g., prepared from a single monomer species), copolymers (e.g., prepared from at least two monomer species), terpolymers (e.g., prepared from at least three monomer species) and graft polymers. The term "resin" is used interchangeably with "polymer." Further, a "siloxane linkage" means a linkage made up of alternating silicon and oxygen atoms. In addition, it is appreciated that the term "polyol" refers to a component having two or more hydroxyl groups.

As indicated, the silicone-containing polyester polyol of the present invention can comprise a reaction product that is prepared from reactants comprising: a diol; a polyol comprising at least three hydroxyl groups; a dimer of a fatty acid comprising two carboxylic acid groups, or an anhydride or ester thereof; and a silicone component.

As used herein, a "diol" refers to a compound having only two hydroxyl groups. The diol used to prepare the silicone-containing polyester polyol can be linear, branched, and/or cyclic. The term "linear" refers to a compound having a straight hydrocarbon chain, the term "branched" refers to a compound having a hydrocarbon chain with a hydrogen replaced by a substituent such as an alkyl group that branches or extends out from a straight chain, and the term "cyclic" refers to a closed ring structure. The diols can also be selected from one or more aliphatic and/or aromatic diols, such as at least two, at least three, or at least four aliphatic diols. The term "aliphatic" refers to non-aromatic straight, branched, or cyclic hydrocarbon structures that contain saturated carbon bonds and which may optionally be interrupted by a heteroatom and/or a functional group. For example, the aliphatic straight, branched, or cyclic hydrocarbon structure can be interrupted by: (i) a heteroatom including, but not limited to, an oxygen atom, a nitrogen atom, a sulfur atom, or a combination thereof; and/or (ii) a functional group including, but not limited to, an ester group, an ether group, a carbonyl group, an amide group, an amino group, or combinations thereof. Further, as used herein, the term "aromatic" refers to a conjugated cyclic hydrocarbon structure with a stability (due to delocalization) that is significantly greater than that of a hypothetical localized structure.

Non-limiting examples of suitable diols include ethylene glycol, diethylene glycol, triethylene glycol, 1,2-propylene glycol, 1,3-propane diol, 2-methyl-1,3-propanediol, 1,4-butane diol, 1,5-pentanediol, 2,2,4-trimethyl 1,3-pentanediol, 2,4-diethyl-1,5-pentanediol, 1,6-hexane diol, 2-ethyl-1,3-hexanediol, neopentyl glycol, propylene glycol, tetraethylene glycol, pentaethylene glycol, hexaethylene glycol, heptaethylene glycol, octaethylene glycol, nonaethylene glycol, decaethylene glycol, 3-hydroxy-2,2-dimethylpropyl 3-hydroxy-2,2-dimethylpropanoate (also known as hydroxypivalyl hydroxypivalate glycol or HPHP glycol), 1,2-cyclohexanedimethanol, 1,3-cyclohexanedimethanol, 1,4-cyclohexanedimethanol, hydrogenated bisphenol A, and combinations thereof.

The diol can comprise at least 30 weight %, at least 35 weight %, or at least 40 weight % based on the total weight of the reactants used to form the silicone-containing polyester polyol. The diol can comprise up to 85 weight %, up to 75 weight %, up to 65 weight %, up to 55 weight %, or up to 45 weight % based on the total weight of the reactants used to form the silicone-containing polyester polyol. The reactants used to form the silicone-containing polyester polyol can comprise a diol in an amount selected within any of the previously described end values. For example, the reactants can comprise a diol in amount selected within a range from 30 to 85 weight %, or from 30 to 65 weight %, or from 35 to 55 weight %, or from 35 to 45 weight %, based on the total weight of the reactants used to form the silicone-containing polyester polyol.

The polyol comprising three or more hydroxyl groups can include various types of polyols such as aliphatic, aromatic, linear, branched, and/or cyclic polyols comprising three or more hydroxyl groups. Non-limiting examples suitable polyols comprising three or more hydroxyl groups include trimethylolpropane, glycerine, trimethylolethane, 1,2,5-hexanetriol, polyether triols, di-trimethylol propane, pentaerythritol, di-pentaerythritol, trimethylol butane, glycerol, tris(2-hydroxyethyl) isocyanurate, and combinations thereof.

The polyol comprising three or more hydroxyl groups can comprise at least 1 weight %, at least 2 weight %, or at least 4 weight % based on the total weight of the reactants used to form the silicone-containing polyester polyol. The polyol comprising three or more hydroxyl groups can comprise up to 20 weight %, up to 15 weight %, up to 10 weight %, or up to 8 weight % based on the total weight of the reactants used to form the silicone-containing polyester polyol. The reactants used to form the silicone-containing polyester polyol can comprise a polyol comprising three or more hydroxyl groups in an amount selected within any of the previously described end values. For example, the reactants can comprise a polyol comprising three or more hydroxyl groups in amount selected within a range from 1 to 20 weight %, or from 2 to 15 weight %, or from 2 to 10 weight %, or from 4 to 8 weight %, based on the total weight of the reactants used to form the silicone-containing polyester polyol.

As indicated, the silicone-containing polyester polyol is also prepared with a dimer of a fatty acid comprising two carboxylic acid groups, or an anhydride or ester thereof. As used herein, a "dimer of a fatty acid" refers to a dimerized product of an unsaturated fatty acid, or an anhydride or ester thereof. In some examples, the dimerized fatty acid comprises at least 18 carbon atoms, at least 24 carbon atoms, at least 30 carbon atoms, or at least 36 carbon atoms. The dimerized fatty acid can comprise up to 50 carbon atoms or up to 44 carbon atoms. The dimerized fatty acid can also be selected from dimerized fatty acids having a number of carbon atoms within a range, for example, from 18 to 50 carbons atoms, or from 30 to 44 carbon atoms. Optionally, the dimerized fatty acid includes a small amount of a monomer or trimer of the fatty acid, or the anhydride or ester thereof.

The dimerized fatty acid comprising two carboxylic acid groups can include an aliphatic dimer of a fatty acid, a dimer of a fatty acid having at least some ethylenially unsaturated carbon bonds, an aromatic dimer of a fatty acid, or a combination. An "aliphatic dimer of a fatty acid" refers to a dimerized fatty acid having non-aromatic straight, branched, or cyclic hydrocarbon structures that contain saturated carbon bonds and which may optionally be interrupted by a heteroatom and/or a functional group as previously described. An "ethylenially unsaturated carbon bond" refers to a carbon-carbon double bond, and "a dimer of a fatty acid having at least some ethylenially unsaturated carbon bonds" refers to a non-aromatic dimerized fatty acid that comprises one or more carbon-carbon double bonds. An "aromatic dimer of a fatty acid" refers to a dimerized fatty acid having at least one aromatic hydrocarbon structure.

The dimerized fatty acid comprising two carboxylic acid groups can include a cyclic ring with at least two linear or branched hydrocarbon chains extending out from the cyclic ring, or least three linear or branched hydrocarbon chains extending out from the cyclic ring, or at least four linear or branched hydrocarbon chains extending out from the cyclic ring. The cyclic ring can comprise an aliphatic cyclic ring, an aromatic cyclic ring, or a combination thereof. Further, the two carboxylic acid groups can be positioned on the same hydrocarbon chain or separate hydrocarbon chains. It is appreciated that the linear or branched carbon chains can comprise contiguous uninterrupted hydrocarbon chains. Alternatively, the linear or branched carbon chains can be interrupted by a heteroatom and/or a functional group as previously described.

Suitable dimerized fatty acids are also commercially available under the trade name EMPOL® such as EMPOL® 1008 from BASF Resins.

The dimer of a fatty acid comprising two carboxylic acid groups, or an anhydride or ester thereof, can comprise at least 25 weight %, at least 35 weight %, or at least 45 weight % based on the total weight of the reactants used to form the silicone-containing polyester polyol. The dimer of a fatty acid comprising two carboxylic acid groups, or an anhydride or ester thereof, can comprise up to 60 weight %, or up to 55 weight %, based on the total weight of the reactants used to form the silicone-containing polyester polyol. The reactants used to form the silicone-containing polyester polyol can comprise a dimer of a fatty acid comprising two carboxylic acid groups, or an anhydride or ester thereof, in an amount selected within any of the previously described end values. For example, the reactants can comprise a dimer of a fatty acid comprising two carboxylic acid groups, or an anhydride or ester thereof, in amount selected within a range from 1 to 20 weight %, or from 25 to 60 weight %, or from 35 to 60 weight %, or from 45 to 55 weight %, based on the total weight of the reactants used to form the silicone-containing polyester polyol.

As previously described, the reactants further include a silicone component. The silicone component comprises siloxane linkages and at least two reactive functional groups selected from hydroxyl groups, phenolic groups, amino groups, thiol groups, carboxylic acid groups, anhydride groups, or combinations thereof. The silicone component can also include other heteroatoms and/or linkages formed within the main chain or within side-chains. For instance, the silicone component can also comprise alkyl and/or alkylene chains having interrupting oxygen atoms that form ether linkages such as those formed from alkylene oxide units. Non-limiting examples of alkylene oxide units include ethylene oxide units, propylene oxide units, and combinations thereof.

Further, the silicone component can comprise reactive functional groups on opposite terminal ends of the silicone structure to provide a containing-silicone polyester polyol with at least siloxane linkages in the backbone or main chain. For example, the silicone component can comprise siloxane linkages, a first hydroxyl group at one terminal end of the silicone structure, and a second hydroxyl group at the opposite terminal end of the silicone structure such that when reacted with the other reactants to form a silicone-containing polyester polyol, the polyester polyol comprises siloxane linkages in its backbone or main chain. Other heteroatoms and/or linkages can be incorporated into the backbone or main chain of the silicone-containing polyester polyol by the silicone component by using a silicone component having heteroatoms and/or linkages as previously described.

The silicone component can also be substantially free, essentially free, or completely free of silanol groups (Si—OH groups). The term "substantially free" as used in this context means the reactants that form the silicone component contains less than 1000 parts per million (ppm), "essentially free" means less than 100 ppm, and "completely free" means less than 20 parts per billion (ppb) of silanol groups based on the total weight of the silicone component.

Non-limiting examples of suitable silicone components are represented by Chemical Structure (I):

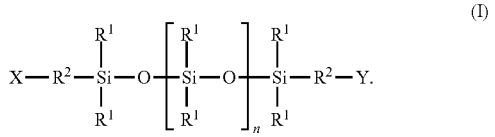

With respect to Chemical Structure (I), n is a number from 1 to 50, such as a number from 2 to 40, or from 3 to 30, or from 4 to 20. Each $R^1$ is independently a hydrogen, a methyl group, or an alkyl group that optionally comprises an interrupting heteroatom, functional group, or a combination thereof. Each $R^2$ is an alkylene group that optionally comprises an interrupting heteroatom, functional group, or a combination thereof. X and Y are each independently a hydroxyl group, a phenolic group, an amino group, a thiol group, a carboxylic acid group, an anhydride group, or combinations thereof.

As used herein, an "alkyl" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_2$ to $C_6$ monovalent hydrocarbon radical. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical. Further, and as indicated above, the alkyl group can optionally comprise an interrupting heteroatom, a functional group, or a combination thereof. The interrupting heteroatom and functional group can include, but is not limited to, any of the heteroatoms and functional groups previously described. For instance, the alkyl group can comprise interrupting oxygen atoms that form ether linkages.

The term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical, or a linear or branched $C_2$ to $C_6$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical. Further, and as indicated above, the alkylene group can optionally comprise an interrupting heteroatom, a functional group, or a combination thereof. The interrupting heteroatom and functional group can include, but is not limited to, any of the heteroatoms and functional groups previously described. For instance, the alkylene group can comprise interrupting oxygen atoms that form ether linkages.

The recitations of linear, branched, or cyclic with respect to alkyl and alkylene groups are herein understood to include: a divalent methylene group or a monovalent methyl group; groups that are linear, such as linear $C_2$-$C_{30}$ alkyl or alkylene groups; groups that are appropriately branched (for example by replacing a hydrogen with a methyl group or an alkyl group as previously described), such as branched $C_3$-$C_{30}$ alkyl or alkylene groups; and groups that are cyclic, such as cyclic $C_3$-$C_{19}$ alkyl or alkylene groups. The cyclic groups also encompass bridged ring polycycloalkyl groups (or bridged ring polycyclic groups) and fused ring polycycloalkyl groups (or fused ring polycyclic groups).

The reactants used to form the silicone-containing polyester can also comprise at least two different silicone components. For instance, the reactants can comprise: (i) a first silicone component with reactive functional groups on opposite terminal ends such as represented by Chemical Structure (I) for example; and (ii) a second silicone component with multiple reactive functional groups on the same terminal end. It is appreciated that the second silicone component with multiple reactive functional groups on the same terminal end will provide a polyester polyol with siloxane linkages in a pendant chain.

Non-limiting examples of additional silicone components with multiple reactive functional groups on the same terminal end are represented by Chemical Structure (II):

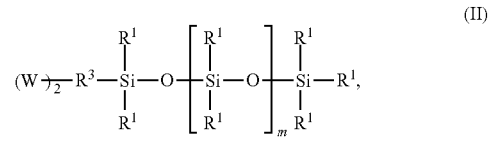

With respect to Chemical Structure (II), m is a number from 1 to 50, such as a number from 2 to 40, or from 3 to 30, or from 4 to 20. Each $R^1$ is independently a hydrogen, a methyl group, or an alkyl group that optionally comprises an interrupting heteroatom, functional group, or a combination thereof as previously described. $R^3$ is an alkylene group that optionally comprises an interrupting heteroatom, functional group, or a combination thereof as previously described. Each W is independently selected from hydroxyalkyl groups, phenolic alkyl groups, aminoalkyl groups, thiolalkyl groups, carboxylic acid alkyl groups, anhydride alkyl groups, or combinations thereof.

As used herein, a "hydroxyalkyl group", a "phenolic alkyl group", an "aminoalkyl group", a "thiolalkyl group", a "carboxylic acid alkyl group", and an "anhydride alkyl group" refers to alkyl groups substituted with a hydroxyl group, a phenolic group, an amino group, a thiol group, a carboxylic acid group, and an anhydride group, respectively. For example, a suitable hydroxyalkyl group includes 2-hydroxyethyl.

Non-limiting examples of suitable silicone components that can be used to prepare the silicone-containing polyester are also commercially available from Shin-Etsu Chemical Co., Gelest Inc., SilTech, and Dow Corning Corporation. For instance, suitable silicone components that can be used to prepare the silicone-containing polyester are commercially available from Shin-Etsu Chemical Co. under the product names KF-6000, KF-2200, X-22-162C, and X-22-168AS.

The silicone component used to form the silicone-containing polyester can have a weight average molecular weight of at least 600 g/mol, at least 800 g/mol, or at least 1,000 g/mol. The silicone component can have a weight average molecular weight of up to 5,000 g/mol, up to 4,000 g/mol, up to 3,000 g/mol, up to 2,000 g/mol, up to 1,500 g/mol, or up to 1,200 g/mol. The silicone component can have a weight average molecular weight selected within any of the previously described end values. For example, the silicone component can have a weight average molecular weight selected within a range of from 600 g/mol to 5,000 g/mol, from 600 g/mol to 3,000 g/mol, 600 g/mol to 1,500 g/mol, or from 600 g/mol to 1,200 g/mol. The weight average molecular weight is determined with gel permeation chromatography relative to linear polystyrene standards of 800 to 900,000 Da with tetrahydrofuran as the eluent at a flow rate of 1 ml min-1 using a Waters 2695 separation module with a Waters 410 differential refractometer (RI detector) and two PLgel Mixed-C (300×7.5 mm) columns for separation.

The silicone component can comprise at least 10 weight %, at least 20 weight %, at least 30 weight %, or at least 40 weight % based on the total weight of the reactants used to form the silicone-containing polyester polyol. The silicone component can comprise up to 80 weight %, up to 70 weight %, up to 60 weight %, or up to 50 weight % based on the total weight of the reactants used to form the silicone-containing polyester polyol. The reactants used to form the silicone-containing polyester polyol can comprise a silicone component in an amount selected within any of the previously described end values. For example, the reactants can comprise a silicone component in amount selected within a range from 10 to 80 weight %, or from 10 to 60 weight %, or from 20 to 50 weight %, or from 20 to 40 weight %, based on the total weight of the reactants used to form the silicone-containing polyester polyol.

Optionally, additional reactants can also be used to form the silicone-containing polyester polyol. For example, the reactants used to form the silicone-containing polyester polyol can further comprise one or more non-dimer diacids, or an anhydride or ester thereof. As used herein, a "non-dimer diacid" refers to a non-dimerized compound comprising two carboxylic acid groups, or an anhydride or ester thereof. In some examples, the non-dimer diacid comprises less than 18 carbon atoms, less than 16 carbon atoms, less than 12 carbon atoms, or less than 10 carbon atoms. The non-dimer diacid can also be selected from non-dimerized acids having a number of carbon atoms within a range, for example, from 2 to 17 carbons atoms, or from 4 to 12 carbon atoms, or from 4 to 10 carbon atoms.

The non-dimer diacid can include, but is not limited to, linear, branched, and/or cyclic non-dimer dicarboxylic acids including the anhydrides and esters thereof. Such non-dimer diacids can be aliphatic or aromatic. Non-limiting examples of non-dimer diacids, or the anhydride or ester thereof, include 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, hexahydrophthalic anhydride, terephthalic acid, isophthalic acid, orthophthalic acid, phthalic anhydride, succinic acid, adipic acid, azelaic acid, sebacic acid, glutaric acid, and combinations thereof.

The non-dimer diacid, or an anhydride or ester thereof, can comprise at least 1 weight %, at least 2 weight %, or at least 3 weight % based on the total weight of the reactants used to form the silicone-containing polyester polyol. The non-dimer diacid, or an anhydride or ester thereof, can comprise up to 40 weight %, up to 30 weight %, up to 20 weight %, or up to 10 weight % based on the total weight of the reactants used to form the silicone-containing polyester polyol. The reactants used to form the silicone-containing polyester polyol can comprise a non-dimer diacid, or an anhydride or ester thereof, in an amount selected within any of the previously described end values. For example, the reactants can comprise a non-dimer diacid, or an anhydride or ester thereof, in amount selected within a range from 1 to 40 weight %, or from 2 to 30 weight %, or from 3 to 20 weight %, or from 3 to 10 weight %, based on the total weight of the reactants used to form the silicone-containing polyester polyol.

The reactants that form the silicone-containing polyester polyol can also be substantially free, essentially free, or completely free of polymerizable ethylenically unsaturated groups. The term "substantially free" as used in this context means the reactants that form the silicone-containing polyester polyol contain less than 1000 parts per million (ppm), "essentially free" means less than 100 ppm, and "completely free" means less than 20 parts per billion (ppb) of polymerizable ethylenically unsaturated groups based on the total weight of the reactants. As used herein, "ethylenically unsaturated" refers to a group having at least one carbon-carbon double bond. The term "polymerizable ethylenically unsaturated" refers to an ethylenically unsaturated group that participates in chemical reactions.

The previously described reactants can be mixed together in the absence of free solvent and reacted to form the silicone-containing polyester polyol. Alternatively, the previously described reactants can be mixed together in a non-aqueous solvent and reacted to form the silicone-containing polyester polyol. As used herein, a "non-aqueous solvent" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5 weight % water, based on the total weight of the liquid medium. The solvents that make up at least or more than 50 weight % of the liquid medium include organic solvents. Non-limiting examples of suitable organic solvents include polar organic solvents e.g. protic organic solvents such as glycols, glycol ether alcohols, and alcohols; and aprotic organic solvents such as ketones, glycol diethers, esters, and diesters. Other non-limiting examples of organic solvents include non-polar solvents such as aromatic and aliphatic hydrocarbons.

The silicone-containing polyester polyol can be prepared in the presence of one or more catalysts. The catalyst may be any catalyst known in the art to be useful for the formation of polyesters. Non-limiting examples of suitable catalysts include triphenyl phosphite, butyl stannoic acid, and combinations thereof.

The silicone-containing polyester polyol formed from the previously described reactants can comprise a weight average molecular weight of at least 1,000 g/mol, at least 2,000 g/mol, or at least 2,500 g/mol. The silicone-containing polyester polyol can have a weight average molecular weight of up to 35,000 g/mol, up to 25,000 g/mol, up to 15,000 g/mol, or up to 5,000 g/mol. The silicone-containing polyester polyol can have a weight average molecular weight selected within any of the previously described end values. For example, the silicone-containing polyester polyol can have a weight average molecular weight selected within a range of from 1,000 g/mol to 35,000 g/mol, from 2,000 g/mol to 25,000 g/mol, from 2,500 g/mol to 15,000 g/mol, or from 2,500 g/mol to 5,000 g/mol. The weight average molecular weight is determined with gel permeation chromatography as previously described.

The silicone-containing polyester polyol prepared from the mixture of reactants described above can have a hydroxyl value of at least 65 mg KOH/g, at least 75 mg KOH/g, at least 85 mg KOH/g, at least 95 mg KOH/g, or at least 100 mg KOH/g. The silicone-containing polyester polyol can have a hydroxyl value of up to 400 mg KOH/g, up to 350 mg KOH/g, up to 300 mg KOH/g, or up to 250 mg KOH/g. The silicone-containing polyester polyol can have a hydroxyl value selected within any of the previously described end values. For example, the silicone-containing polyester polyol can have a hydroxyl value selected within a range of from 65 mg KOH/g to 400 mg KOH/g, from 75 mg KOH/g to 350 mg KOH/g, from 85 mg KOH/g to 300 mg KOH/g, or from 100 mg KOH/g to 250 mg KOH/g.

The hydroxyl value of the silicone-containing polyester polyol is determined by esterification of the sample with excess acetic anhydride. The excess acetic anhydride is converted to acetic acid by hydrolysis and titrated potentiometrically with standard potassium hydroxide. The volume difference of titrate potassium hydroxide between a blank (no reaction) and the sample corresponds to the acid content of the sample, from which the hydroxyl number is calculated as the number of milligrams of potassium hydroxide needed to neutralize the acid in one gram of sample. The hydrolyzing solution used in the determination is a mixture of dimethylformamide, pyridine, and distilled water, and the acetylating reagent is a mixture of acetic anhydride and dichloroethane with p-toluene sulphonic acid as the catalyst.

The present invention is also directed to a coating composition that includes at least one of the silicone-containing polyester polyols previously described and a crosslinker reactive with the silicone-containing polyester polyol. It is appreciated that the coating composition of the present invention can include two or more, such as three or more, of any of the previously described silicone-containing polyester polyols previously described.

The silicone-containing polyester polyol can comprise at least 5 weight %, at least 10 weight %, at least 20 weight %, or at least 30 weight % based on the total solids weight of the coating composition. The silicone-containing polyester polyol can comprise up to 90 weight %, up to 80 weight %, up to 70 weight %, up to 60 weight %, or up to 50 weight % based on the total solids weight of the coating composition. The coating composition can comprise a silicone-containing polyester polyol in an amount selected within any of the previously described end values. For example, the coating composition can comprise a silicone-containing polyester polyol in amount selected within a range from 5 to 90 weight %, or from 10 to 70 weight %, or from 20 to 60 weight %, or from 30 to 50 weight %, based on the total solids weight of the coating composition.

As indicated, the coating composition can also comprise a crosslinker that is reactive with at least the silicone-containing polyester polyol described above. As used herein, a "crosslinker" refers to a molecule comprising two or more functional groups that are reactive with other functional groups and which is capable of linking two or more monomers or polymer molecules through chemical bonds. The coatings of the present invention can be cured through the reaction between the functional groups of the silicone-containing polyester polyol and the functional groups of the crosslinker to form a resinous binder. "Curing" refers to bond formation resulting in a crosslinked coating. Curing may occur upon application of an external stimulus including, but not limited to, heat.

Non-limiting examples of crosslinkers include phenolic resins, epoxy resins, beta-hydroxy (alkyl) amide resins, alkylated carbamate resins, isocyanates, polyacids, anhydrides, organometallic acid-functional materials, polyamines, polyamides, aminoplasts, and mixtures thereof. As such, the crosslinkers can comprise, but are not limited to, compounds comprising isocyanate groups including blocked isocyanate groups, epoxide groups, acids groups, anhydride groups, amino groups such as primary and secondary amino groups, amide groups, aminoplast based compounds, and combinations thereof.

Non-limiting examples of isocyanates include multifunctional isocyanates (polyisocyanates) such as linear, branched, and/or cyclic polyisocyanates. The polyisocyanates can also be selected to only include certain types of polyisocyanates such as only linear and branched non-cyclic polyisocyanates for example. Examples of multifunctional polyisocyanates include aliphatic diisocyanates such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. Pat. No. 8,389,113 at column 4, lines 10-40, which is incorporated by reference herein. The polyisocyanates can also be selected from polyisocyanates that do not include (i.e., are free of) isocyanurate trimers, allophanates, or uretdiones. Suitable polyisocyanates are well known in the art and widely available commercially. Examples of commercially available isocyanates include DESMODUR® N 3300A, DESMODUR® Z 4470BA, DESMODUR® N 3900, and DESMODUR® N 3400, which are commercially available from Bayer Corporation.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used. While the aldehyde used is most often formaldehyde, other aldehydes such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Non-limiting examples of commercially available aminoplasts that can be used include CYMEL® 303, CYMEL® 322, CYMEL® 327, CYMEL® 380, and CYMEL® 1130 (available from Cytec Industries and/or Allnex Group).

The crosslinker can comprise at least 15 weight %, at least 20 weight %, or at least 25 weight % based on the total solids weight of the coating composition. The crosslinker can comprise up to 60 weight %, up to 50 weight %, up to 40 weight %, or up to 35 weight % based on the total solids weight of the coating composition. The coating composition can comprise a crosslinker in an amount selected within any of the previously described end values. For example, the coating composition can comprise a crosslinker in an amount selected within a range from 15 to 60 weight %, or from 20 to 50 weight %, or from 25 to 40 weight %, or from 25 to 35 weight %, based on the total solids weight of the coating composition.

The coating composition of the present invention can also include a matting agent. As used herein, the term "matting agent" refers to a material added to a coating composition to reduce the gloss of a coating formed from the composition. The term "matting agent" is interchangeable with the term "flatting agent". The matting agent can also provide other properties in the final coating. For instance, the matting agent can also improve abrasion, rub, and/or scratch resistance; control viscosity; and/or enhance soft touch properties in the final coating. Non-limiting examples of suitable matting agents include metal hydroxides, metal oxides, silicas, pyrogenic silica, wax-treated silica, micronized wax, polyether condensate, polyamide microbeads, polyurethane microbeads, silicone microbeads, and mixtures thereof.

The coating composition of the present invention can also include a silicone component that is the same or different than the silicone components used to prepare the silicone-containing polyester polyol. The silicone component can comprise at least one, at least two, or at least three reactive functional groups that are reactive with at least the crosslinker. The reactive functional groups can include, but are not limited to, a hydroxyl group, thiol group, (meth)acrylate group, carboxylic acid group, amine group, epoxide group, carbamate group, amide group, urea group, isocyanate group (including blocked isocyanate group), and combinations thereof.

Non-limiting examples of additional silicone components that can be added to the coating compositions of the present invention include polymers with side chains comprising alternating silicon and oxygen atoms and which include a reactive functional group reactive. For instance, the additional silicone component can comprise a silicone-containing polymer including, but not limited to, (meth)acrylate polymers, polyether polymers, polyamide polymers, polyamine polymers, and combinations thereof that have side chains extending out from the backbone or main chain of such polymers and which comprise alternate silicon and oxygen atoms and at least one reactive functional group. A non-limiting example of such a silicone component is a hydroxyl-functional silicone-containing polyacrylate such as BYK®-SILCLEAN 3700 available from Byk Additives & Instruments.

The additional silicone component can comprise at least 0.1 weight %, at least 0.25 weight %, or at least 0.3 weight % based on the total solids weight of the coating composition. The additional silicone component can comprise up to 1.5 weight %, up to 1 weight %, or up to 0.75 weight % based on the total solids weight of the coating composition. The coating composition can comprise an additional silicone component in an amount selected within any of the previously described end values. For example, the coating composition can comprise an additional silicone component in amount selected within a range from 0.1 to 1.5 weight %, or from 0.25 to 1 weight %, or from 0.3 to 0.7 weight % based on the total solids weight of the coating composition.

It is appreciated that the silicone-containing polyester polyol and, optionally, the additional silicone component can form all or part of the film-forming resin of the coating composition. Alternatively, one or more additional film-forming resins can also be used in the coating composition. For example, the coating composition can also include any of a variety of thermoplastic and/or thermosetting film-forming resins known in the art. As used herein, "film-forming resin" refers to a resin that can form a self-supporting continuous film on at least a horizontal surface of a substrate upon removal of any diluents or carriers present in the composition. Further, the term "thermosetting" refers to resins that "set" irreversibly upon curing or crosslinking, wherein the polymer chains of the polymeric components are joined together by covalent bonds. Once cured or crosslinked, a thermosetting resin will not melt upon the application of heat and is insoluble in solvents. As noted, the film-forming resin can also include a thermoplastic film-forming resin. As used herein, the term "thermoplastic" refers to resins that include polymeric components that are not joined by covalent bonds and, thereby, can undergo liquid flow upon heating and are soluble in solvents.

The additional film-forming resin can be selected from, for example, polyurethanes, acrylic polymers, polyester polymers that are different from those described above, polyamide polymers, polyether polymers, polysiloxane polymers that are different from those described above, polyepoxy polymers, fluoropolymers, epoxy resins, vinyl resins, copolymers thereof, and mixtures thereof. Thermosetting or curable film-forming polymers or resins typically have functional groups. The film-forming resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), and combinations thereof. Appropriate mixtures of film-forming resins may also be used in the preparation of the present coating compositions.

A crosslinker is typically reacted with an additional thermoset film-forming resin when present in the coating composition. The crosslinker can include any of the crosslinkers previously described. The crosslinker can also be the same or different than the crosslinker reactive with the silicone-containing polyester polyol. The additional thermoset film-forming resin can also have functional groups that are reactive with themselves; in this manner, such thermosetting resins are self-crosslinking.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, corrosion resistant particles, corrosion inhibiting additives, fillers including, but not limited to, micas, talc, and clays, antioxidants, hindered amine light stabilizers, UV light absorbers and stabilizers, surfactants, flow and surface control agents, thixotropic agents, reactive diluents, catalysts, reaction inhibitors, and other customary auxiliaries. For example, the coating composition can also comprise a non-aqueous solvent such as any of the non-aqueous solvents previously described.

The silicone-containing polyester polyol and, optionally, the additional components that make up the coating composition described herein can also be substantially free, essentially free, or completely free of polymerizable ethylenically unsaturated groups. The term "substantially free" as used in this context means the silicone-containing polyester polyol and, optionally, the additional components that make up the coating composition contain less than 1000 parts per million (ppm), "essentially free" means less than 100 ppm, and "completely free" means less than 20 parts per billion (ppb) of polymerizable ethylenically unsaturated groups based on the total weight of the polyester polyol and, optionally, any of the additional components that make up the coating composition described herein.

The coating compositions of the present invention are at least partially applied to a wide range of substrates and cured to form a coating. For example, the coating compositions of the present invention can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly(ethyleneterephthalate) (PET), polycarbonate, polycarbonate acrylonitrile butadiene styrene (PC/ABS), polyamide, wood, veneer, wood composite, particle board, medium density fiberboard, cement, stone, glass, paper, cardboard, textiles, leather, both synthetic and natural, and the like.

Coatings formed from the coating compositions of the present invention are particularly useful when at least partially coated over consumer electronic products. For example, the coatings of the present invention can be applied to substrates found on laptops, tablets, keyboards, cellular phones, other handheld electronic devices, and the like. Based on the above, the present invention further includes an electronic product or electronic component having a surface at least partially coated with the coatings described herein.

The coating compositions of the present invention can be applied by any means standard in the art, such as electrocoating, spraying, electrostatic spraying, dipping, rolling, brushing, and the like and then cured to form a coating. The coatings of the present invention can be applied to a dry film thickness of from 10 micrometers to 100 micrometers, or from 20 micrometers to 80 micrometers.

The coating compositions of the present invention may also be used alone or in combination with primers and/or basecoats. A "primer coating composition" refers to a coating composition from which an undercoating may be deposited onto a substrate in order to prepare the surface for application of a protective or decorative coating system. A basecoat refers to a coating composition from which a coating is deposited onto a primer and/or directly onto a substrate optionally including components (such as pigments) that impact the color and/or provide other visual impact and which may be overcoated with a protective and decorative coating system.

The coating compositions can be applied to a substrate and cured to form coatings that have a soft, smooth touch or feel. As used herein, "soft touch coatings" refer to coatings that can impart a range of soft touch or feel, for example, a velvety touch or feel, a silky touch or feel, or a rubbery touch or feel, to a substrate. For example, coatings formed from the coating compositions described herein have been found to exhibit: a Fischer microhardness within a range of from 1 to 30 N/mm$^2$, or from 2-25 N/mm$^2$, or from 5-20 N/mm$^2$, or from 10-18 N/mm$^2$, as measured by a Fischerscope HM2000 stylus microhardness instrument following the instruction described in the Fischerscope HM2000 Manual ("Fischer microhardness test"); a coefficient of friction within a range of from 0.01 to 0.40, or from 0.05 to 0.35, or from 0.10 to 0.30, or from 0.15 to 0.25, as measured by a QUALITEST™ FX-7000 coefficient of friction tester according to ASTM Method D1894-14; and/or a surface roughness of 0.1 micro-inch to 60 micro-inches, or 1 micro-inch to 60 micro-inches, or from 5 micro-inches to 40 micro-inches, or from 10 micro-inches to 30 micro-inches, or from 10 micro-inches to 25 micro-inches, as measured by a Taylor Hobson Precision Surtronic 3 Duo profilometer following the instruction described in the Taylor Hobson Precision Surtronic 3 Duo Manual ("surface roughness test"). As used herein, "Fischer microhardness" refers to the hardness of a material to deformation, "coefficient of friction" refers to the ratio of the force that maintains contact between an object and a surface and the frictional force that resists the motion of the object, and "surface roughness" refers to the texture of a surface such as the texture of a surface of a coating that is quantified by the vertical deviations of the surface from its ideal form.

In addition to good soft touch properties, the coating compositions can be applied to a substrate and cured to form coatings that have a good anti-fingerprinting properties. As used herein, the term "anti-fingerprint coating" refers to a coating that masks or prevents fingerprint marks and smudges and which allows for easy removal of marks and smudges that do appear. That is, the coatings deposited from the coating compositions described herein have been found to mask or prevent fingerprint marks and smudges, and the marks and smudges that are present on the coating can be easily removed. For example, the coatings generally exhibit only a slightly visible fingerprint mark or smudge at most and generally require no more than 3 swipes with a dry cloth or tissue to completely remove the fingerprint mark or smudge from the coating.

Thus, the coating compositions described herein can be applied to a substrate to form coatings that have a soft touch, good anti-fingerprinting properties, and other properties desired in a coating.

The following examples are presented to demonstrate the general principles of the invention. The invention should not be considered as limited to the specific examples presented. All parts and percentages in the examples are by weight unless otherwise indicated.

Examples 1-5

Polyester Polyol Preparation

Polyester polyols were prepared from the components listed in Table 1.

TABLE 1

| | Amount (grams) | | | | |
|---|---|---|---|---|---|
| Component | Ex. 1 | Ex. 2 | Ex. 3 | Comp. Ex. 4 | Comp. Ex. 5 |
| Silicone Diol KF-6000 [1] | 110.00 | 125.00 | 225.00 | 200.00 | 0 |
| 1,6 Hexanediol | 72.99 | 79.00 | 56.88 | 0 | 110.00 |
| 2-Methyl-1,3-propanediol | 31.81 | 30.12 | 21.69 | 56.95 | 53.68 |
| Trimethylol propane | 21.02 | 23.89 | 17.20 | 39.95 | 39.08 |
| Neopentyl glycol hydroxyl pivalate | 0 | 0 | 0 | 59.50 | 0 |
| EMPOL ® 1008 diacid [2] | 280.50 | 212.50 | 153.00 | 0 | 0 |
| Adipic acid | 23.62 | 53.68 | 38.65 | 171.95 | 212.00 |

[1] A silicone having a hydroxyl group on each terminal end, commercially available from Shin-Etsu Chemical Co.
[2] A fully hydrogenated dimer of a fatty acid having two carboxylic acid groups, commercially available from BASF Resins.

The polyester polyol samples were prepared by independently mixing their respective components listed in Table 1 in a suitable reaction vessel. The contents of the vessel were heated to 150° C. and a nitrogen cap was switched to a nitrogen sparge. The temperature of the reaction mixture was raised to 180° C. in stages and held for a period of time. The contents of the reactor were cooled to less than 80° C. and poured out. Various properties of the polyester polyol sample are shown in Table 2.

TABLE 2

| Polyester Polyol | Hydroxyl Value (mg KOH/g)[3] | Weight Average Molecular Weight (g/mol)[4] | Number Average Molecular Weight (g/mol)[4] |
|---|---|---|---|
| Silicone-modified polyester polyol of Example 1 | 146 | 3524 | 1985 |
| Silicone-modified polyester polyol of Example 2 | 149 | 1854 | 3371 |
| Silicone-modified polyester polyol of Example 3 | 142 | 1601 | 2298 |
| Polyester polyol of Comparative Example 4 | 156 | 1167 | 3285 |

TABLE 2-continued

| Polyester Polyol | Hydroxyl Value (mg KOH/g)[3] | Weight Average Molecular Weight (g/mol)[4] | Number Average Molecular Weight (g/mol)[4] |
|---|---|---|---|
| Polyester polyol of Comparative Example 5 | 163 | 3930 | 1796 |

[3] Determined by esterification of the sample with excess acetic anhydride as previously described.
[4] Determined by gel permeation chromatography relative to linear polystyrene standards of 800 to 900,000 Da with tetrahydrofuran as the eluent at a flow rate of 1 ml min−1 using a Waters 2695 separation module with a Waters 410 differential refractometer (RI detector) and two PLgel Mixed-C (300 × 7.5 mm) columns for separation.

Example 6

Preparation of Solvent Blends

Two solvent blends were prepared from the components listed in Table 3.

TABLE 3

| Component | Solvent Blend A (grams) | Solvent Blend B (grams) |
|---|---|---|
| Methyl amyl ketone | 365.3 | 600 |
| N-butyl acetate | 365.3 | 900 |
| Ethyl acetate | 269.4 | 400 |
| Methyl ether propylene glycol | 0 | 100 |

Solvent Blend A and Solvent Blend B were each independently prepared by mixing their respective components listed in Table 3 in a plastic bottle for two minutes.

Examples 7-15

Preparation and Evaluation of Anti-Fingerprint Soft Touch Coatings

Part A: An initial set of coating compositions were prepared from the components listed in Table 4.

TABLE 4

| | Amount (grams) | | | | |
|---|---|---|---|---|---|
| Component | Ex. 7 | Ex. 8 | Ex. 9 | Comp. Ex. 10 | Comp. Ex. 11 |
| Silicone-modified polyester polyol of Example 1 | 16.87 | | | | |
| Silicone-modified polyester polyol of Example 2 | | 16.94 | | | |
| Silicone-modified polyester polyol of Example 3 | | | 20.16 | | |
| Polyester polyol of Comparative Example 4 | | | | 16.77 | |
| Polyester polyol of Comparative Example 5 | | | | | 16.65 |
| Solvent Blend A of Example 6 | 11.20 | 11.25 | 13.38 | 11.14 | 11.40 |
| ACEMATT ® TS 100 [5] | 1.73 | 1.43 | 1.88 | 1.42 | 1.65 |
| CP 4-8891 [6] | 1.94 | 1.74 | 2.07 | 1.72 | 1.85 |
| Catalyst [7] | 0.61 | 0.62 | 0.73 | 0.61 | 0.62 |
| BYK ®-SILCLEAN 3700 [8] | 1.12 | 1.13 | 1.34 | 1.12 | 1.01 |
| BYK ®-370 [9] | 0.15 | 0.15 | 0.18 | 0.15 | 0.16 |
| Crosslinker [10] | 15.59 | 15.86 | 19.08 | 16.44 | 33.68 |
| Solvent Blend B of Example 6 | 25.79 | 25.89 | 31.17 | 25.64 | 26.26 |

[5] Untreated silica matting agent, commercially available from Evonik.
[6] Treated amorphous silica matting agent, commercially available from Grace.
[7] A 10% solution of dibutyl tin dilaurate in methyl ether propylene glycol solvent.
[8] Solution of an OH-functional silicone modified polyacrylate, commercially available from BYK Additives & Instruments.
[9] Silicone-containing surface additive, commercially available from BYK Additives & Instruments.
[10] Hexamethylene diisocyanate based crosslinker.

Coating compositions were prepared by weighing all the component listed in Table 4, except for the crosslinker and Solvent Blend B, in a 4 oz. glass jars and then shaking the components for 60 minutes using a Lau disperser Model Das H-TP 200-K mixer. After the initial dispersions were completed, the crosslinker and Solvent B Blend B were added to the jars and the resulting samples were mixed for 2 minutes with an air driven plastic mixing blade. The resulting coating compositions were then spray applied onto black PC/ABS panels and cured at 60° C. for 30 minutes followed by a six hour post bake at 80° C. to form anti-fingerprint soft touch coatings.

Part B: Three additional coating compositions to provide a higher gloss due to lower 60° gloss values (<1.5) were further prepared by first mixing the components listed in Tables 5.

TABLE 5

| | Amount (grams) | |
|---|---|---|
| Component | Ex. 12 | Comp. Ex. 13 |
| Silicone-modified polyester polyol of Example 1 | 5.82 | |
| Polyester polyol of Comparative Example 5 | | 5.65 |
| Solvent Blend A of Example 6 | 3.99 | 3.87 |
| Catalyst [7] | 0.22 | 0.21 |
| BYK ®-SILCLEAN 3700 [8] | 0.35 | 0.34 |
| BYK ®-370 [9] | 0.05 | 0.05 |
| Solvent Blend B of Example 6 | 9.18 | 8.91 |
| Crosslinker [10] | 5.38 | 5.95 |

Coating compositions were prepared by weighing all the component listed in Table 5, except for the crosslinker and Solvent Blend B, in a 4 oz. glass jars and then shaking the components for 60 minutes using a Lau disperser Model Das H-TP 200-K mixer. After the initial dispersions were completed, the crosslinker and Solvent B Blend B were added to the jars and the resulting samples were mixed for 2 minutes with an air driven plastic mixing blade. The compositions were then used to modify the compositions from Examples 7 and 11 as shown in Table 6.

TABLE 6

| | Amount (grams) | |
|---|---|---|
| Component | Ex. 14 | Comp. Ex. 15 |
| Coating composition of Example 7 | 72.03 | |
| Coating composition of Comparative Example 11 | | 69.73 |
| Coating composition of Example 12 | 10.81 | |
| Coating composition of Comparative Example 13 | | 10.63 |
| Solvent Blend B of Example 6 | | 4.94 |

The resulting coating compositions were then spray applied onto black PC/ABS panels and cured at 60° C. for 30 minutes followed by a six hour post bake at 80° C. to form anti-fingerprint soft touch coatings.

The dry film thickness and gloss of the cured coatings are listed in Table 7.

TABLE 7

| Coating Identification | Dry Film Thickness (micrometers)[11] | Gloss Measurments[12] | | |
|---|---|---|---|---|
| | | 20° | 60° | 85° |
| Coating of Example 14 | 57-60μ | 0.4 | 4.9 | 26.8 |
| Coating of Comparative Example 15 | 47-50μ | 0.3 | 2.8 | 14.0 |

[11]Measured with a Mitutoyo Digimatic Micrometer IP65 following the instructions described in the Mitutoyo Digimatic Micrometer IP65 manual.
[12]Measured with a Byk Micro-Tri-Gloss instrument following the instructions described in the Byk Micro-Tri-Gloss manual.

The coated panels were then evaluated for anti-fingerprint performance. The panels were evaluated for initial fingerprint transfer and the ease with which fingerprints could be removed by wiping with a dry facial tissue. The results are listed in Table 8.

TABLE 8

| Coating Identification | Rating for Initial Fingerprint Transfer | Wipes Needed to Remove Fingerprint |
|---|---|---|
| Coating of Example 14 | Moderate | 7 wipes |
| Coating of Comparative Example 15 | Moderate | 10+ wipes |

As shown in Table 8, the fingerprints applied to the sample with no silicone monomer (Comparative Example 15) could not be removed with 10 wipes of the facial tissue, while the fingerprints applied to the sample with silicone monomer (Example 14) could be removed with only 7 wipes of the facial tissue.

Example 16

Evaluation of Anti-Fingerprinting and Soft Touch Properties

Part A: A coating composition was first prepared from the components listed in Table 9.

TABLE 9

| Component | Amount (grams) |
|---|---|
| Silicone-containing polyester polyol of Example 1 | 5.91 |
| Solvent Blend A of Example 6 | 3.92 |
| Catalyst [7] | 0.22 |
| BYK ®-SILCLEAN 3700 [8] | 0.39 |
| BYK ®-370 [9] | 0.05 |
| Crosslinker [10] | 5.46 |
| Solvent Blend B of Example 6 | 9.04 |

A coating composition was first prepared with the components listed in Table 9 according to the steps described in Examples 7-15. About 3.5 grams of the resulting coating composition was then mixed with about 46.9 grams of the coating composition prepared in Example 7 for two minutes with an air driven plastic mixing blade. The final coating composition was spray applied onto black PC/ABS panels and cured at 60° C. for 30 minutes followed by a six hour post bake at 80° C. to form an anti-fingerprint soft touch coating. The dry film thickness and gloss of the cured coating is listed in Table 10.

TABLE 10

| Dry Film Thickness (micrometers)[11] | Gloss Measurments[12] | | |
|---|---|---|---|
| | 20° | 60° | 85° |
| 45-50 | 0.1 | 1.5 | 13.0 |

Part B: The coating applied to the black PC/ABS panels in Part A and Comparative Example 10 were tested for anti-fingerprinting and soft touch properties.

Anti-fingerprint performance was tested by wiping a fingerprint across an individual's forehead and then touching the coating. The degree of transfer is then evaluated. A heavy transfer typically increases the gloss and is highly visible whereas poor fingerprint transfer is much less visible. The visibility of the fingerprint was based on a scale of 0 to 5 with 0 not being visible and 5 being the most visible. After evaluation of the initial fingerprints, the cleanability of the fingerprints were tested by taking a dry cloth or tissue and attempting to wipe off the applied fingerprints. For screening purposes, the fingerprint was wiped three times and then reevaluated. A new cloth or tissue should be used for each fingerprint. The lower the cleanability number, the better the performance. The results of the fingerprint testing are shown in Table 11.

TABLE 11

| Coating Sample | Fingerprint Visibility Ranking | Fingerprint Cleanability Ranking |
|---|---|---|
| Applied Coating of Part A | 1 | 3 |
| Applied Coating of Comparative Example 10 | 4 | 4 |

As indicated, the coatings were also evaluated for soft touch properties. The soft touch properties were evaluated by testing coefficient of friction, surface roughness, and Fischer microhardness. The results of the fingerprint testing are shown in Table 12.

TABLE 12

| Coating Sample | Coefficient of Friction[13] | Surface Roughness (Ra)[14] | Fischer Microhardness[15] |
|---|---|---|---|
| Applied Coating of Part A | 0.20 | 0.76 | 14.2 |
| Applied Coating of Comparative Example 10 | 0.25 | 0.73 | 14.2 |

[13]Measured with a QUALITEST ™ FX-7000 coefficient of friction tester according to ASTM Method D1894-14.
[14]Measured with a Taylor Hobson Precision Surtronic 3 Duo profilometer in accordance with the surface roughness test.
[15]Measured with a Fischerscope HM2000 stylus microhardness instrument in accordance with the Fischer microhardness test.

The present invention is also directed to the following clauses.

Clause 1: A silicone-containing polyester polyol comprising a reaction product prepared from reactants comprising: a diol; a polyol comprising at least three hydroxyl groups; a dimer of a fatty acid comprising two carboxylic acid groups, or an anhydride or ester thereof; and a silicone component comprising siloxane linkages and at least two reactive functional groups selected from hydroxyl groups, phenolic groups, amino groups, thiol groups, carboxylic acid groups, anhydride groups, or combinations thereof.

Clause 2: The silicone-containing polyester polyol of clause 1, wherein the reactants further comprise a non-dimer diacid, or an anhydride or ester thereof.

Clause 3: The silicone-containing polyester polyol of clauses 1 or 2, wherein the diol comprises at least two different aliphatic diols.

Clause 4: The silicone-containing polyester polyol of clause 3, wherein at least one of the aliphatic diols is a branched diol.

Clause 5: The silicone-containing polyester polyol of any of clauses 1-4, wherein the dimer of the fatty acid comprising two carboxylic acid groups, or the anhydride or ester thereof, comprises an aliphatic ring with at least two linear or branched carbon chains extending therefrom.

Clause 6: The silicone-containing polyester polyol of any of clauses 2-5, wherein the non-dimer diacid, or the anhydride or ester thereof, is an aliphatic non-dimer diacid, or an anhydride or ester thereof.

Clause 7: The silicone-containing polyester polyol of any of clauses 1-6, wherein the silicone component has a weight average molecular weight within a range of from 600 g/mol to 5,000 g/mol.

Clause 8: The silicone-containing polyester polyol of any of clauses 1-7, wherein the silicone component comprises at least two hydroxyl groups.

Clause 9: The silicone-containing polyester polyol of any of clauses 1-8, wherein the silicone component is a compound represented by Chemical Structure (I):

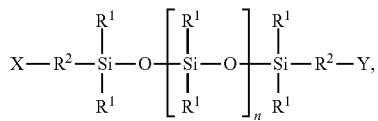

(I)

wherein n is a number of from 1 to 50;
each $R^1$ is independently a hydrogen, a methyl group, or an alkyl group that optionally comprises an interrupting heteroatom, functional group, or a combination thereof;
each $R^2$ is an alkylene group that optionally comprises an interrupting heteroatom, functional group, or a combination thereof; and
X and Y are independently selected from a hydroxyl group, a phenolic group, an amino group, a thiol group, a carboxylic acid group, an anhydride group, or combinations thereof.

Clause 10: The silicone-containing polyester polyol of clause 9, wherein X and Y each comprise a hydroxyl group.

Clause 11: The silicone-containing polyester polyol of any of clauses 1-10, wherein the reactants further comprise a second silicone component represented by Chemical Structure (II):

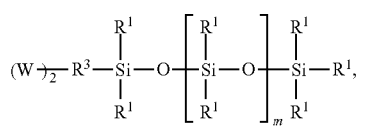

(II)

wherein m is a number from 1 to 50;
each $R^1$ is independently a hydrogen, a methyl group, or an alkyl group that optionally comprises an interrupting heteroatom, functional group, or a combination thereof;
$R^3$ is an alkylene group that optionally comprises an interrupting heteroatom, functional group, or a combination thereof; and
each W is independently selected from hydroxyalkyl groups, phenolic alkyl groups, aminoalkyl groups, thiolalkyl groups, carboxylic acid alkyl groups, anhydride alkyl groups, or combinations thereof.

Clause 12: A coating composition comprising: (a) a silicone-containing polyester polyol comprising a reaction product prepared from reactants comprising: (i) a diol; (ii) a polyol comprising at least three hydroxyl groups; (iii) a dimer of a fatty acid comprising two carboxylic acid groups, or an anhydride or ester thereof; and (iv) a silicone component comprising siloxane linkages and at least two reactive functional groups selected from hydroxyl groups, phenolic groups, amino groups, thiol groups, carboxylic acid groups, anhydride groups, or combinations thereof; and (b) a crosslinker reactive with (a).

Clause 13: The coating composition of clause 12, wherein the reactants that form the silicone-containing polyester polyol further comprise a non-dimer diacid, or an anhydride or ester thereof.

Clause 14: The coating composition of clauses 12 or 13, wherein the diol that forms the silicone-containing polyester polyol comprises at least two different aliphatic diols.

Clause 15: The coating composition of any of clauses 12-14, wherein the silicone component that forms the silicone-containing polyester polyol comprises at least two hydroxyl groups.

Clause 16: The coating composition of any of clauses 12-15, wherein the silicone component is a compound represented by Chemical Structure (I):

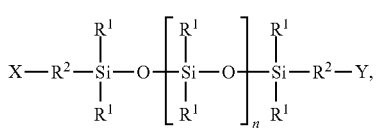

(I)

wherein n is a number of from 1 to 50;
each $R^1$ is independently a hydrogen, a methyl group, or an alkyl group that optionally comprises an interrupting heteroatom, functional group, or a combination thereof;
each $R^2$ is an alkylene group that optionally comprises an interrupting heteroatom, functional group, or a combination thereof; and
X and Y are independently selected from a hydroxyl group, a phenolic group, an amino group, a thiol group, a carboxylic acid group, an anhydride group, or combinations thereof.

Clause 17: The coating composition of clause 16, wherein X and Y each comprise a hydroxyl group.

Clause 18: The coating composition of any of clauses 12-17, wherein the reactants that form the silicone-containing polyester polyol further comprise a second silicone component represented by Chemical Structure (II):

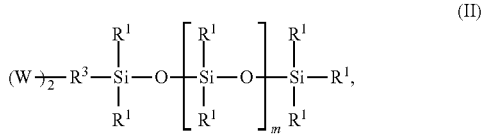

wherein m is a number from 1 to 50;
each $R^1$ is independently a hydrogen, a methyl group, or an alkyl group that optionally comprises an interrupting heteroatom, functional group, or a combination thereof;
$R^3$ is an alkylene group that optionally comprises an interrupting heteroatom, functional group, or a combination thereof; and
each W is independently selected from hydroxyalkyl groups, phenolic alkyl groups, aminoalkyl groups, thiolalkyl groups, carboxylic acid alkyl groups, anhydride alkyl groups, or combinations thereof.

Clause 19: The coating composition of any of clauses 12-18, further comprising a matting agent.

Clause 20: The coating composition of any of clauses 12-19, further comprising a non-aqueous solvent.

Clause 21: The coating composition of any of clauses 12-20, further comprising a third silicone component that is the same or different than the first or second silicone components of the silicone-containing polyester polyol, wherein the third silicone component is reactive with the crosslinker.

Clause 22: A substrate at least partially coated with a coating formed from the coating composition of any of clauses 12-21.

Clause 23: An electronic device or electronic component comprising a surface at least partially coated with a coating formed from the coating composition of any of clauses 12-21.

Whereas particular embodiments of this invention have been described above for purposes of illustration, it will be evident to those skilled in the art that numerous variations of the details of the present invention may be made without departing from the invention as defined in the appended claims.

The invention claimed is:

1. A silicone-containing polyester polyol comprising a reaction product prepared from reactants comprising:
   a diol;
   a polyol comprising at least three hydroxyl groups;
   a dimer of a fatty acid comprising two carboxylic acid groups, or an anhydride or ester thereof; and
   a silicone component comprising siloxane linkages and at least two reactive functional groups selected from hydroxyl groups, phenolic groups, amino groups, thiol groups, carboxylic acid groups, anhydride groups, or combinations thereof.

2. The silicone-containing polyester polyol of claim 1, wherein the reactants further comprise a non-dimer diacid, or an anhydride or ester thereof.

3. The silicone-containing polyester polyol of claim 1, wherein the diol comprises at least two different aliphatic diols.

4. The silicone-containing polyester polyol of claim 3, wherein at least one of the aliphatic diols is a branched diol.

5. The silicone-containing polyester polyol of claim 1, wherein the dimer of the fatty acid comprising two carboxylic acid groups, or the anhydride or ester thereof, comprises an aliphatic ring with at least two linear or branched carbon chains extending therefrom.

6. The silicone-containing polyester polyol of claim 2, wherein the non-dimer diacid, or the anhydride or ester thereof, is an aliphatic non-dimer diacid, or an anhydride or ester thereof.

7. The silicone-containing polyester polyol of claim 1, wherein the silicone component has a weight average molecular weight within a range of from 600 g/mol to 5,000 g/mol.

8. The silicone-containing polyester polyol of claim 1, wherein the silicone component comprises at least two hydroxyl groups.

9. The silicone-containing polyester polyol of claim 1, wherein the silicone component is a compound represented by Chemical Structure (I):

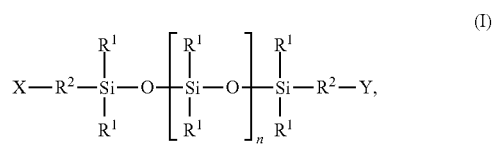

wherein n is a number of from 1 to 50;
each $R^1$ is independently a hydrogen, a methyl group, or an alkyl group that optionally comprises an interrupting heteroatom, functional group, or a combination thereof;
each $R^2$ is an alkylene group that optionally comprises an interrupting heteroatom, functional group, or a combination thereof; and
X and Y are independently selected from a hydroxyl group, a phenolic group, an amino group, a thiol group, a carboxylic acid group, an anhydride group, or combinations thereof.

10. The silicone-containing polyester polyol of claim 9, wherein X and Y each comprise a hydroxyl group.

11. A coating composition comprising:
    (a) a silicone-containing polyester polyol comprising a reaction product prepared from reactants comprising:
        (i) a diol;
        (ii) a polyol comprising at least three hydroxyl groups;
        (iii) a dimer of a fatty acid comprising two carboxylic acid groups, or an anhydride or ester thereof; and
        (iv) a silicone component comprising siloxane linkages and at least two reactive functional groups selected from hydroxyl groups, phenolic groups, amino groups, thiol groups, carboxylic acid groups, anhydride groups, or combinations thereof; and
    (b) a crosslinker reactive with (a).

12. The coating composition of claim 11, wherein the reactants that form the silicone-containing polyester polyol further comprise a non-dimer diacid, or an anhydride or ester thereof.

13. The coating composition of claim 11, wherein the diol that forms the silicone-containing polyester polyol comprises at least two different aliphatic diols.

14. The coating composition of claim 11, wherein the silicone component that forms the silicone-containing polyester polyol comprises at least two hydroxyl groups.

15. The coating composition of claim 11, wherein the silicone component that forms the silicone-containing polyester polyol is a compound represented by Chemical Structure (I):

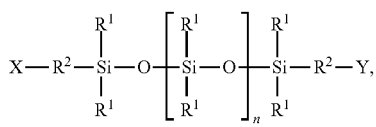 (I)

wherein n is a number of from 1 to 50;
each $R^1$ is independently a hydrogen, a methyl group, or an alkyl group that optionally comprises an interrupting heteroatom, functional group, or a combination thereof;
each $R^2$ is an alkylene group that optionally comprises an interrupting heteroatom, functional group, or a combination thereof; and
X and Y are independently selected from a hydroxyl group, a phenolic group, an amino group, a thiol group, a carboxylic acid group, an anhydride group, or combinations thereof.

16. The coating composition of claim 15, wherein X and Y each comprise a hydroxyl group.

17. The coating composition of claim 11, further comprising a matting agent.

18. The coating composition of claim 11, further comprising a non-aqueous solvent.

19. The coating composition of claim 11, further comprising a third silicone component that is the same or different than the first or second silicone components of the silicone-containing polyester polyol, wherein the third silicone component is reactive with the crosslinker.

20. A substrate at least partially coated with a coating formed from the coating composition of claim 11.

21. An electronic device or electronic component comprising a surface at least partially coated with a coating formed from the coating composition of claim 11.

* * * * *